(12) United States Patent
Rheem

(10) Patent No.: US 6,202,000 B1
(45) Date of Patent: Mar. 13, 2001

(54) MONITORING SYSTEM FOR SEMICONDUCTOR DEVICE FABRICATION FACILITY

(75) Inventor: Byeong-ki Rheem, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/168,092

(22) Filed: Oct. 8, 1998

(30) Foreign Application Priority Data

Dec. 30, 1997 (KR) .................................... 9-79191

(51) Int. Cl.⁷ .................................................. G06F 19/00
(52) U.S. Cl. ............................................ 700/121; 700/108
(58) Field of Search .................................. 700/121, 108, 700/109; 340/825.06, 825.07; 438/10–11, 14

(56) References Cited

U.S. PATENT DOCUMENTS

| | | | |
|---|---|---|---|
| 4,315,251 | * | 2/1982 | Robinson et al. ............... 340/310.06 |
| 4,446,458 | * | 5/1984 | Cook ................................ 340/825.06 |
| 5,568,042 | * | 10/1996 | Nyberg et al. ....................... 323/211 |
| 5,631,839 | * | 5/1997 | Lemoine ............................... 700/108 |
| 5,907,491 | * | 5/1999 | Canada et al. ....................... 700/108 |

* cited by examiner

Primary Examiner—William Grant
Assistant Examiner—Zoila Cabrera
(74) Attorney, Agent, or Firm—Jones Volentine, LLC (57) ABSTRACT

There is provided a monitoring system for monitoring semiconductor device fabrication facilities by allocating a specific frequency on each of the semiconductor device fabrication facilities, and connecting between each of the facilities and a central monitoring apparatus with information transmission line and selective signal line thereby simplifying the monitoring lines. The monitoring system comprises: a central monitoring apparatus outputting a signal having a specific frequency for selecting an object to be monitored via a selective signal line, and receiving the information transferred via an information transmission line from the object responsive to the specific frequency signal; and a plurality of semiconductor device fabrication facilities each of which is connected to the selective signal line and the information transmission line in parallel with a specific frequency for response allocated for each of them, and outputs a specific information received from its corresponding process via the information transmission line if it is selected by the select signal transmitted via the selective signal line to have its corresponding frequency.

16 Claims, 5 Drawing Sheets

FIG. 5

MONITORING SYSTEM FOR SEMICONDUCTOR DEVICE FABRICATION FACILITY

BACKGROUND OF THE INVENTION

1) Field of the Invention

The present invention relates to a monitoring system for semiconductor device fabrication facilities, and more particularly, to a monitoring system for semiconductor device fabrication facilities for simplifying the line installment between each facility and the monitoring system by providing a certain frequency to each facility to carry out a corresponding fabrication process of semiconductor devices and a measurement process therefor, and using one information transmission line and selective signal line.

2) Description of the Related Art

Generally, a certain pattern is formed on a semiconductor wafer through an array of processing steps such as oxidation, diffusion, etching, deposition, or ion-implantation, and semiconductor devices are manufactured via an assembly process. Between the above processing steps, or during a certain processing step, various kinds of analysis, inspection, or measurement is performed on wafers or chips.

Each analyzing step or measuring step for a certain process is carried out on its corresponding fabrication facility, and so, several and various kinds of fabrication facilities are provided on the semiconductor device fabrication factory.

In order to produce normal semiconductor devices, it is necessary to check the operational state of the process carried out in each fabrication facility, or the state of the facility itself every process time, and so, in case of an abnormal operational state being found, proper and quick action should be made. One embodiment of the monitoring systems for the above purpose is disclosed in U.S. patent Ser. No. 5,568,042, entitled "Monitoring And Control of Filter In A Power Network."

Meanwhile, the malfunctioning process or facility abnormality is checked using various kinds of sensors installed in the corresponding semiconductor device fabrication facility, and in case of a process malfunction or facility abnormality, a corresponding sensor senses and outputs the sensing signal responsive thereto.

The sensing signal is applied to an alarming means for alerting an operator at work, or is transferred to a central monitoring apparatus for providing a judgment regarding the operational state of a corresponding process remotely. In order to transfer the sensing signal to the central monitoring apparatus, the central monitoring apparatus and the semiconductor device fabrication facility should be interfaced.

Figure 1:
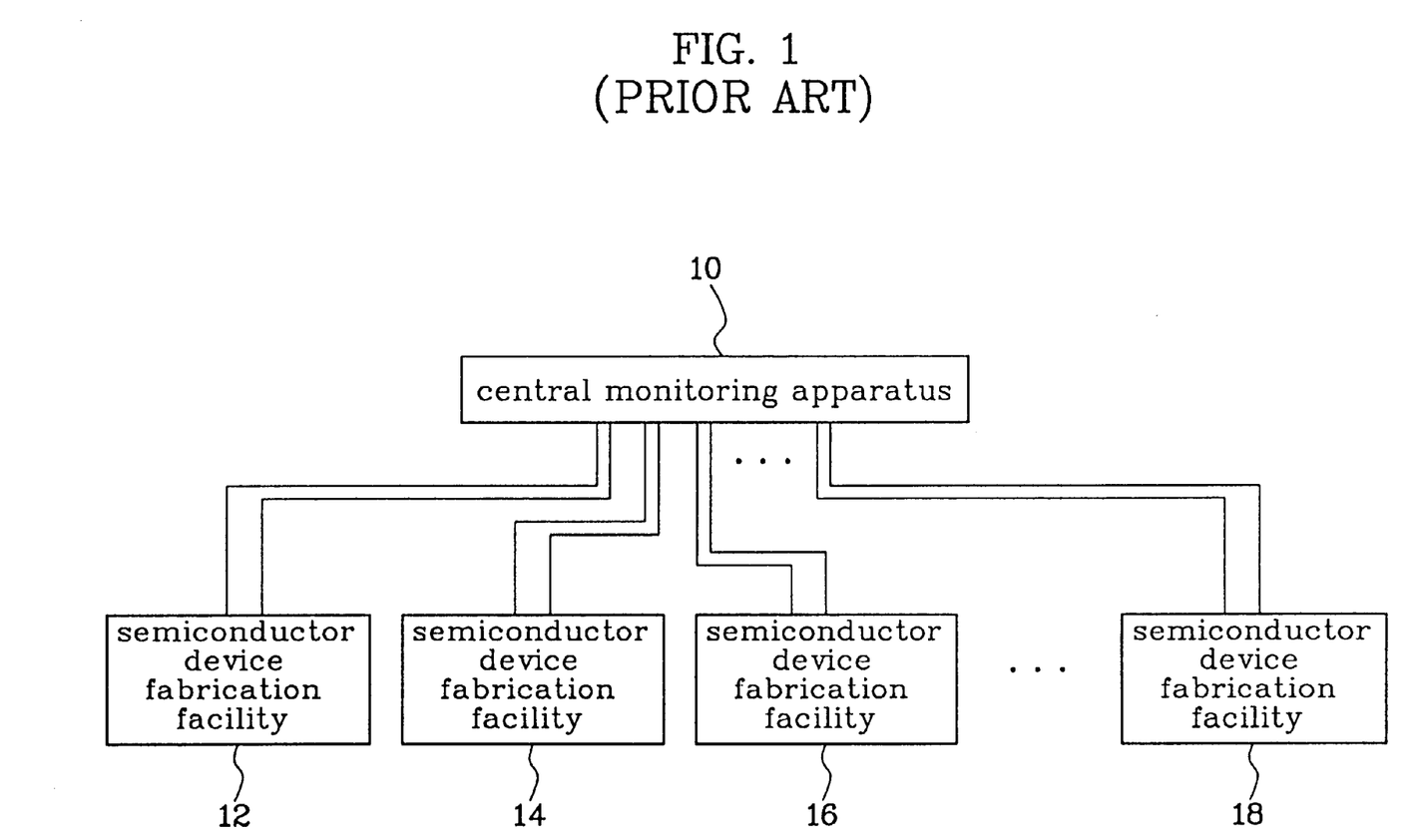
FIG. 1 is a block diagram showing a conventional monitoring system for semiconductor device fabrication facility.

As shown in FIG. 1, for remote-monitoring, the central monitoring apparatus 10 is connected to each semiconductor device fabrication facility 12 to 18 to receive the sensing signals.

The conventional central monitoring apparatus 10 is individually connected to each semiconductor device fabrication facility 12 to 18, that is, with an independent line distribution.

For the interface between the central monitoring apparatus 10 and each semiconductor device fabrication facility, a pair of inner lines are necessary for the formation of an electrical loop. That is, the number of the lines formed with a pair of inner lines is the same as the number of the semiconductor device fabrication facilities connected to the central monitoring apparatus 10. Therefore, more semiconductor device fabrication facilities to be monitored require more lines connected to the central monitoring apparatus which is connected to each facility on a one-to-one basis. As a result, the total length of the lines is longer and more complicated, thereby increasing the installment expenses and the difficulties of the layout inside the fabrication factory. Further, the control and the management of the lines become more difficult.

SUMMARY OF THE INVENTION

The present invention is directed to provide a monitoring system for semiconductor device fabrication facilities which substantially obviates one or more of the problems due to the limitations and the disadvantages of the prior art.

One object of the present invention is to provide a monitoring system for semiconductor device fabrication facilities which simplifies the monitoring line layout between a central monitoring apparatus and a plurality of semiconductor device fabrication facilities so as to allow easy maintenance and control of the monitoring system in the semiconductor device fabrication process.

To achieve these and other advantages and in accordance with the purpose of the present invention, a preferred embodiment of a monitoring system for semiconductor device fabrication facilities comprises: a central monitoring apparatus, outputting a signal having a specific frequency for selecting an object to be monitored via a selective signal line, and receiving information transferred via an information transmission line from the object responsive to the specific frequency signal; and a plurality of semiconductor device fabrication facility monitors, each of which is connected to the selective signal line and the information transmission line in parallel, with a specific frequency for response allocated for each of them, which outputs specific information received from its corresponding process via the information transmission line if it is selected by the select signal transmitted via the selective signal line having its corresponding frequency.

The central monitoring apparatus outputs a signal via the selective signal line with the frequency of the signal varied accordingly for selecting a semiconductor device fabrication facility responsive thereto so as to transfer information via the information transmission line. In a preferred embodiment, the central monitoring apparatus comprises: an output determining means for designating the frequency of the signal to be generated; a frequency generating means equipped with a plurality of frequency generators each generating a different frequency and outputting a signal successively from the frequency generators; an outputting means for outputting an output signal of the frequency generating means to be transmitted via the selective signal line; an inputting means for receiving certain information transmitted via the information transmission line; and a display means for displaying the response according to the input from the inputting means.

The output determining means preferably comprises: a first oscillating part for generating and outputting a first pulse signal; a counter for performing a binary count for the first pulse signal; and an encoder for allowing the frequency generators to selectively output a signal by a specific order according to the counting result of the counter.

The outputting means preferably comprises first 3-state buffers which correspond one-to-one to the frequency generators, and on which the output from the output-determining means is applied as an Enable signal.

Preferably, the input means comprises: second 3-state buffers which correspond one-to-one to the frequency generators, and on which the output from the output-determining means is applied as an Enable signal; a second oscillating part which outputs a second pulse signal; and a latch which delays the signal from the second 3-state buffers by the second pulse signal for a certain time, and outputs it.

In a preferred embodiment, the displaying means comprises a plurality of lamps matching the number of the second 3-state buffers and corresponding one-to-one thereto. The lamps are preferably operated according to the signal output from the latch.

The central monitoring apparatus operates by outputting a signal via the selective signal line varying the frequency of the signal, and selecting a semiconductor device facility corresponding to the signal via the information transmission line.

In a preferred embodiment, the central monitoring apparatus comprises: an output determining means for designating the frequency of the signal to be generated at random; a frequency generating means equipped with a plurality of frequency generators generating a different frequency respectively, and outputting the signal having a random different frequency, from the frequency generators; an outputting means for outputting an output signal of the frequency generating means to be transmitted via the selective signal line; an inputting means for receiving certain information transmitted via the information transmission line; and a displaying means for displaying the response according to the output from the inputting means.

In addition, the output-determining means preferably comprises: a designation signal input means supplying a signal for selecting one of the frequency generators at random, and an encoder outputting a signal through one of the frequency generators by the input signal from the designation signal input means.

The designation signal input means may comprise an input part for inputting a keystroke signal, or a host computer.

The outputting means preferably comprises first 3-state buffers which correspond one-to-one to the frequency generators, and on which the output from the output-determining means is applied as Enable signal.

In addition, the inputting means preferably comprises: second 3-state buffers which correspond one-to-one to the frequency generators, and on which the output from the output determining means is applied as an Enable signal; a second oscillating part which generates a second pulse signal and outputs; and a latch which delays the signal from the second 3-state buffers by the second pulse signal for a certain time, and outputs it.

The displaying means preferably comprises a plurality of lamps matching the number of the second 3-state buffers, and corresponding one-to-one thereto, and the lamps are operated according to the signal output from the latch.

In a preferred embodiment, the semiconductor device fabrication facility monitor comprises a switching means being operated on receipt of the sensing signal from a sensor, and a filtering means for transferring the sensing signal from the switching means to the information transmission line if the frequency of the select signal applied from the central monitoring apparatus via the selective signal line is identical to a predetermined frequency.

In a preferred embodiment, the filtering means comprises a frequency filter for determining if the frequency of the select signal is identical to the predetermined frequency; and a switch for selectively transferring the sensing signal from the switching means to the information transmission line responsive to the select signal applied according to the determination of the frequency filter.

It is to be understood that both the foregoing general description and the following detailed description are exemplary and explanatory and are intended to provide further explanation of the invention as claimed.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
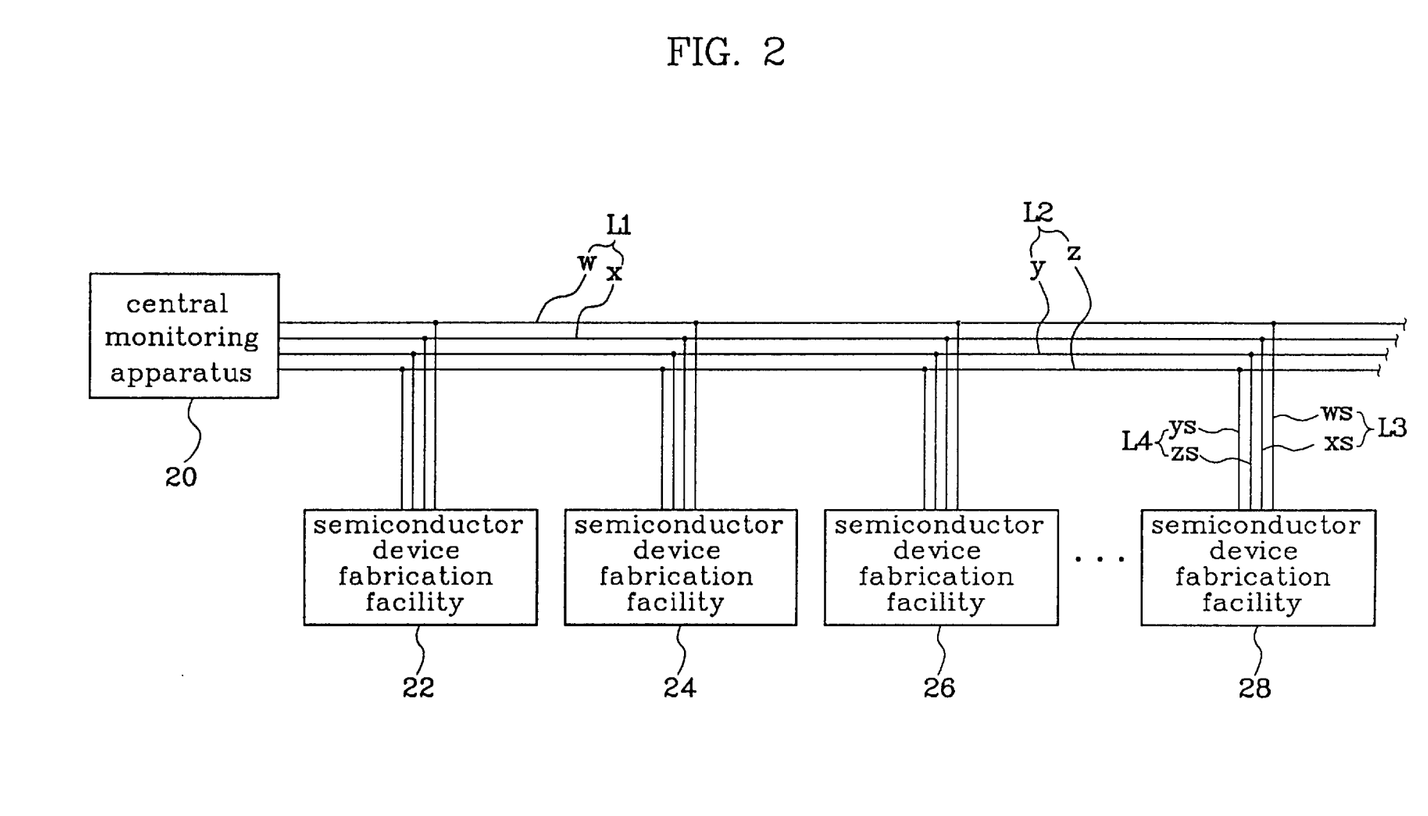
FIG. 2 is a block diagram showing a monitoring system for semiconductor device fabrication facility according to one embodiment of the present invention.

Referring to FIG. 2 showing a preferred embodiment of the present invention, a main selective signal line (L1) comprising a first in-line "w" and a second in-line "x", and a main information transmission line (L2) comprising a third in-line "y" and a fourth in-line "z" are connected to a central monitoring apparatus 20. The main selective signal line (L1) and the main information transmission line (L2) are installed close to the semiconductor device fabrication facilities (22 to 28) to be monitored, and pass through the facilities.

Each of semiconductor device fabrication facilities (22 to 28) are connected to a sub-selective signal line (L3) and a sub-information transmission line (L4) which are connected to the main selective signal line (L1) and the main information transmission line (L2) in parallel. The sub-selective signal line (L3) a fifth in-line "ws" and a sixth in-line "xs," and the sub-information transmission line (L4) comprises a seventh in-line "ys" and a eighth in-line "zs".

Figure 3:
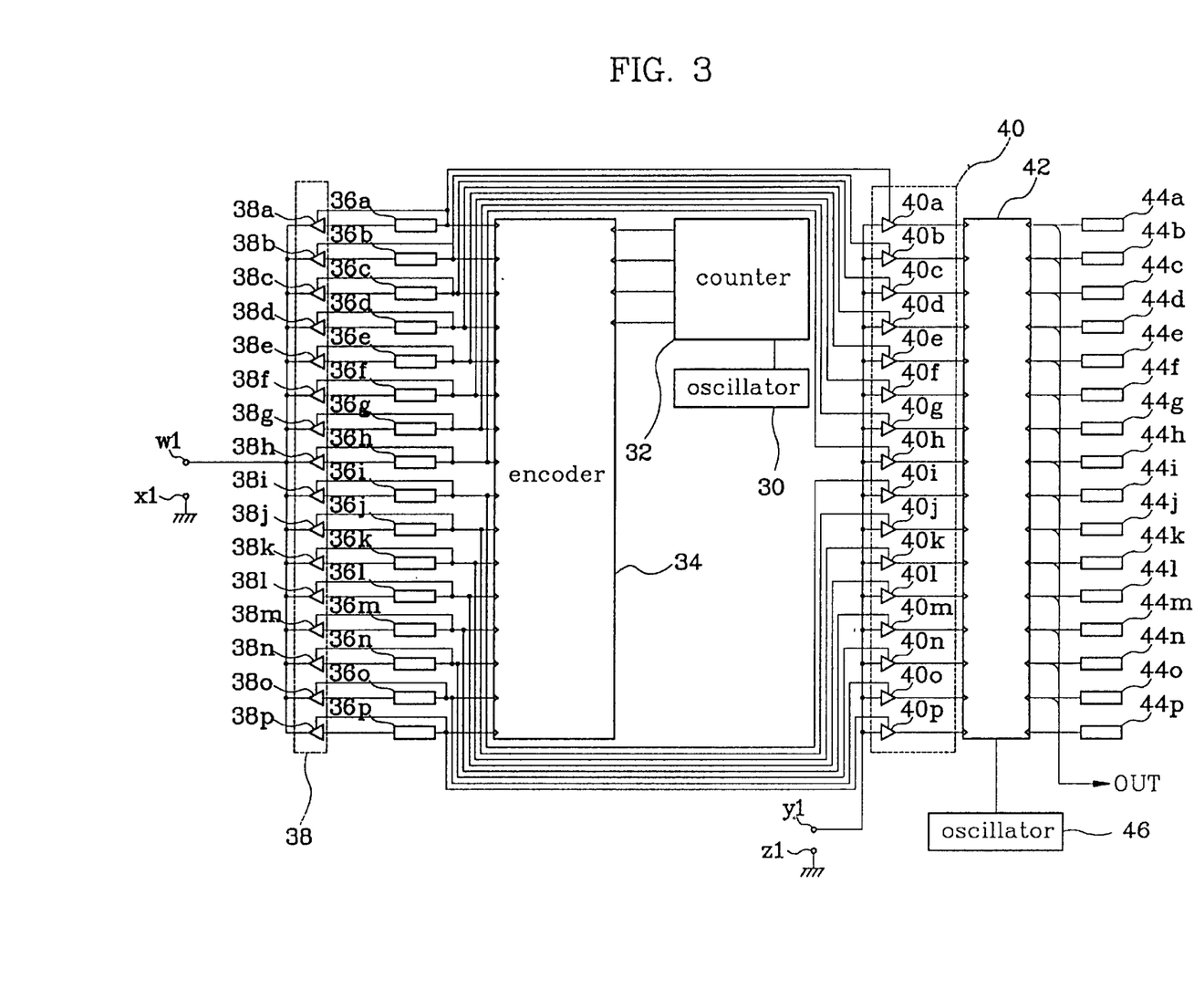
FIG. 3 is a detailed block diagram showing one embodiment of the central monitoring system of the FIG. 2.
Figure 5:
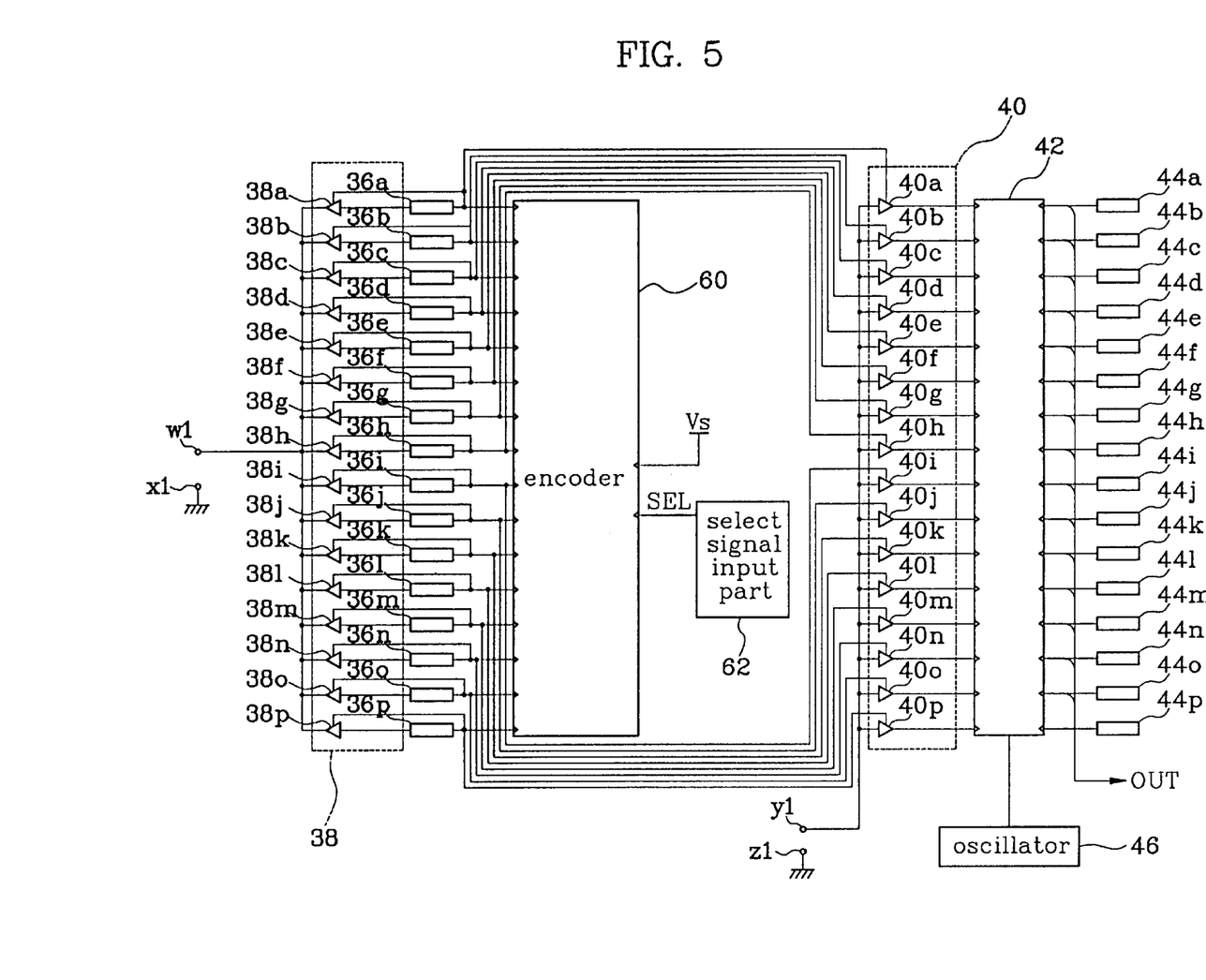
FIG. 5 is a detailed block diagram showing another embodiment of the central monitoring system of the FIG. 2.

The central monitoring apparatus 20 can be constructed with a scan method using a counter, as shown in FIG. 3, or with a direct designation method of directly designating and connecting with an object to be monitored, as shown in FIG. 5.

First, referring to FIG. 3, according to the scan method the central monitoring apparatus 20 has terminals "w1" and "x1" connected to the first in-line "w" and the second in-line "x" of the main selective signal line (L1) respectively, and terminals "y1" and "z1" connected to the third in-line "y" and the fourth in-line "z" of the main information transmission line (L2) respectively.

The central monitoring apparatus 20 has an oscillator 30 which produces oscillation having a specific frequency, and the oscillator 30 provides a pulse having a specific frequency to a counter 32. The counter 32 provides the result of counting the number of the pulses having a specific frequency to a 4-to-16 encoder 34 having sixteen output terminals 3, each of the output terminals being connected to its corresponding frequency generator 36a to 36p. 3-state buffer 38a to 38p of a buffer 38 are connected to the output of the frequency generators 36a to 36p on a one to one basis. From each output terminal, the encoder 34 applies an Enable signal to its corresponding 3-state buffer 38a to 38p. Outputs of the 3-state buffer 38a to 38p are connected in parallel to the terminal "w1."

As described above, each of the frequency generator 36a to 36p has its own intrinsic Oscillating Frequency, and the embodiment of the present invention uses 16 KHz of frequency bandwidth in order to identify each of semiconductor device fabrication facilities, so that the difference between each frequency produced from the frequency generator 36a to 36p is 1 KHz. That is, the frequency generator 36a has a 1 KHz oscillating frequency, and the frequency of each of the rest of the frequency generators is increased by 1 KHz until finally, the frequency generator 36p has an oscillating frequency of 16 KHz. However, the system is not confined to this, and the frequency ranges can be extended taking into account interference to the frequency signals and the installation of additional semiconductor device fabrication facilities so that the frequency differences between each of the frequency generators 36a to 36p can be appropriately extended.

Meanwhile, a terminal "y1" of the central monitoring apparatus 20 is connected to inputs of a 3-state buffer 40a to 40p of a buffer 40. The signals transferred through the main information transmission line L2 are applied to the buffer 40, and each output of the 3-state buffer 40a to 40p is connected with its corresponding input terminal of a latch 42. The latch 42 has the same number of output terminals as the input terminals. Lamps 44a to 44p are connected to the output terminals of the latch 42 on a one-to-one basis so as to turn a light on and off. The latch 42 is operated by a clock signal applied from an oscillator 46.

Meanwhile, each of the output terminals of the encoder 34 is connected to the terminals of the 3-state buffer 40a to 40p on a one-to-one basis so as to apply an Enable signal. Each output terminal of the latch 42 is connected to a connectable host computer (not shown) or an alarming apparatus (not shown) applying output signals for providing information on the communication state between the central monitoring apparatus 20 and each of the semiconductor device fabrication facilities 22 to 28.

Figure 4:
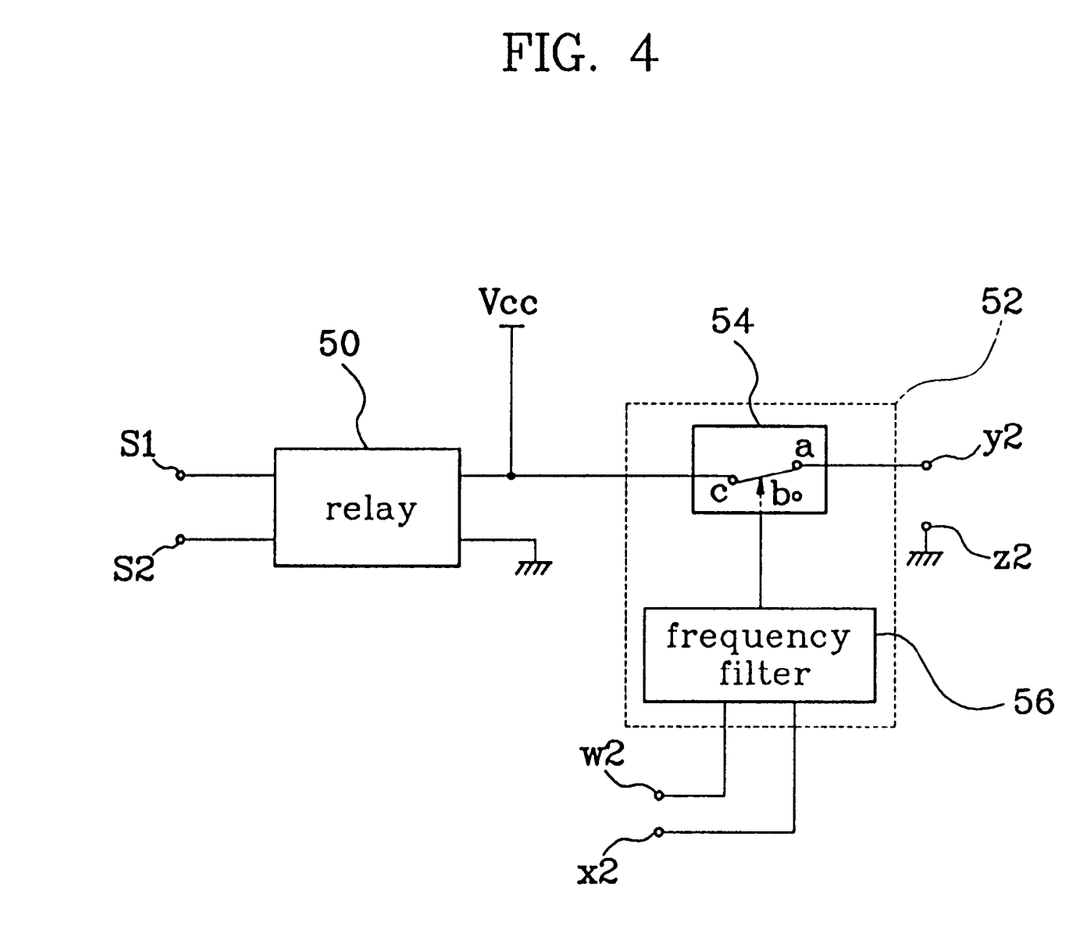
FIG. 4 is a detailed block diagram showing one embodiment of the semiconductor device fabrication facility monitor.

To interface the above described central monitoring apparatus 20 and each of the semiconductor device fabrication facilities 22 to 28, the semiconductor device fabrication facility has a structure as shown in FIG. 4.

Each of the semiconductor device fabrication facilities 22 to 28 has a monitor with terminals "w2" and "x2" which are connected to the sub selective signal line L3 respectively, and terminals "y2" and "z2" which are connected to the sub information signal line L4 respectively, and further comprises a sensor (not shown) for sensing the state of the fabrication process, the facility operation, and other measurements.

The output signals from the sensor are applied on a relay 50 via terminals S1 and S2. A first output terminal among the output terminals of the relay 50 is grounded, and a second output terminal is connected to a Common Terminal "c" of a switch 54 constituting an interface part 52. The switch 54 has two Select Terminals "a" and "b". The Select Terminal "a" is connected to a terminal "y2" which is connected to a seventh inner line "ys" of the sub information transmission line L4.

In addition, the switch 54 is controlled by the output signal of a frequency filter 56 included in the interface part 52. The frequency filter 56 makes a determination of the frequency signals applied via the terminals "w2" and "x2", that is, determining whether the frequency of the applied signals matches with the frequency designated for identifying each of the semiconductor device fabrication facilities so as to apply a high or low level signal to the switch 54 according to the above determination.

Hereinafter a description for the operation of a first embodiment of the present invention will be provided.

First, the counter 32 starts counting with the operation of the oscillator 30 of the central monitoring apparatus 20. The counter 32 performs a known binary counting operation repeatedly counting from $(0000)_2$ to $(1111)_2$.

The selection of the output terminal outputting a high level signal in the encoder 34 is determined according to the counting result by the counter 32. When the counting result of the counter 32 is $(0000)_2$, the encoder 34 outputs a high level signal as the input signal of the frequency generator 36a and as the Enable signals of the 3-state buffer 38a and the 3-state buffer 40a respectively. When the counting result of the counter 32 is $(0001)_2$, the encoder 34 outputs a high level signal as the input signal of the frequency generator 36b and as the Enable signals of 3-state buffer 38b and the 3-state buffer 40b respectively.

As described above, with the counting result proceeding, the encoder 34 changes the output terminals in serial order. Finally, when the counting result of the counter 32 is $(1111)_2$, the encoder 34 outputs signals for the input of the frequency generator 36p and for the Enable signals of 3-state buffer 38p and the 3-state buffer 40p respectively. Then, the above steps are repeated.

For example, the frequency generator 36a outputs a signal having a 1 KHz frequency to the 3-state buffer 38a, and with the Enable signal applied from the encoder 34 to the 3-state buffer 38a, the 3-state buffer 38a outputs a signal having a 1 KHz frequency via the terminals "w1" and "x1" connected to the main selective signal line L1. At this time, the inputs to the other frequency generators 36b to 36p are set up as low level signals, and so, those frequencies are not generated. The corresponding 3-state buffers 38b to 38p are put into a Disable state so that the outputs do not occur, and at the same time, the reverse input to the corresponding frequency generators (36b to 36p) from the output of the 3-state buffer 38a is prevented.

The signal having the above 1 KHz frequency is supplied to each semiconductor device fabrication facility 22 to 28 via the main selective signal line L1 and the sub-selective signal line L3 and, responsive thereto, a corresponding monitor for each semiconductor device fabrication facility 22 outputs a sensing signal to a sub-information transmission line L4 and a main information transmission line L2.

Hereinafter, a detailed description of the operation in the semiconductor device fabrication facility 22 to 28 will be provided.

A frequency filter 56 included in an interface part 52 of each of the semiconductor device fabrication facilities 22 to 28, which are connected to the central monitoring apparatus 20, filters a specific frequency respectively (1 KHz, 2 KHz, 3 KHz, . . . , 16 KHz).

Accordingly, when a signal having a specific frequency is transferred from the central monitoring apparatus 20 via the main and sub-selective signal lines L1, L3, the signal is applied to the frequency filter 56 of each of the semiconductor device fabrication facilities 22 to 28, and the frequency filter 56 of each fabrication facility monitor filters the signal, passing only the signal when it has a corresponding frequency.

For example, the frequency filter 56 of the monitor for semiconductor device fabrication facility 22 has a frequency for filtering as 1 KHz. If the frequency of the signal supplied from the central monitoring apparatus 20 via the main selective signal line L1 is 1 KHz, the frequency filter 56 outputs a high level signal to the switch 54. The switch 54 internally connects Common terminal "c" and Select terminal "a" and, responsive thereto, a relay 50 interlocked with the sensing signal is operated. As a result, a signal having a high level constant voltage $V_{cc}$, or a low level voltage, is output through the switch 54 to the sub and main information transmission lines L4, L2. The signal output through the main information transmission line L2 is supplied to the terminals "y1" and "z1" of the central monitoring apparatus 20.

Unless the frequency of the signal output from the central monitoring apparatus 20 via the main selective signal line L1 is 1 KHz, the frequency filter 56 outputs a low level signal to the switch 54. The switch 54 internally connects Common terminal "c" and Select terminal "b" and, responsive thereto, the output from the relay 50, which is connected with the sensing signal, is disconnected from the sub-information transmission line L4.

The sensing signal transferred via the sub and the main information transmission lines L4, L2 by this order is supplied to the input of each 3-state buffer 40a to 40p via the terminal "y1" and the terminal "z1".

A 3-state buffer 40a of the 3-state buffer 40a to 40p is in an Enabled state on receipt of the Enable signal from the encoder 34 and applies an Enable signal to the latch 42. The latch 42 delays the input signal having a specific frequency applied from the oscillator 46, and applies the signal to a lamp 44a. Then, the lamp 44a turns on the light responsive to the applied signal.

A high level signal is output from one of the output terminals of the encoder 34, and the signal having varying frequencies, that is, being increased from 1 KHz by 1 KHz is transferred via the main selective signal line L1 connected to the terminals "w1" and "x1". The monitor for the semiconductor device fabrication facility among the facilities 22 to 28 responsive to its corresponding frequency outputs a signal to the central monitoring apparatus 20 via the main and the sub information transmissions line L2, L4, and accordingly, a corresponding lamp (44a to 44p) responsive to the signal lights up. Eventually, the lamps 44a to 44p are operated by turns, and turned on or off displaying the monitoring results for the process state, the facility state, or the measurement state of the corresponding semiconductor device fabrication facility (22 to 28).

The output signal of the latch 42 is supplied to a connectable host computer or an alarming apparatus, which is used to provide information on the state of the semiconductor device fabrication facility to which it is connected for monitoring, or for an alarm.

In another aspect of the present invention, a second embodiment for operating the central monitoring apparatus 20 by the above-mentioned direct designation method is illustrated in FIG. 5.

The central monitoring apparatus 20 in FIG. 5 has an encoder 60, which receives a signal for selecting an output terminal from a select signal input part 62, instead of the oscillator 30 and the counter 32 of FIG. 2. Accordingly, the encoder 60 outputs a constant voltage Vs to the structure identical to that in FIG. 2. The other components of the central monitoring apparatus 20 are the same as those in FIG. 2, and like numbers are supplied for like components shown in FIG. 2.

The above select signal input part 62 can be provided by a keyboard, for inputting a binary value, and/or a host computer (not shown) so as to input a select signal (SEL) having a binary value to the encoder 60.

That is, in the second embodiment, the object to be monitored is a semiconductor device fabrication facility corresponding to the select signal from the select signal input part 62, and the direct and continuous selection of the object to be monitored is possible.

The line installation for the connection between the central monitoring apparatus and the semiconductor device fabrication facilities to be monitored can be simplified according to the first and the second embodiments of the present invention.

A single main selective signal line and a single main information transmission line from the central monitoring apparatus are installed close to the semiconductor device fabrication facilities, which are installed and distributed inside a fabrication factory by a certain lay-out. A sub-selective signal line and a sub information transmission line from each of the semiconductor device fabrication facilities are connected to the main selective signal line and the main information transmission line respectively, thereby completing a network for monitoring between them.

Therefore, the expenses for the installation are reduced, and with the further installation of the semiconductor device fabrication facilities, the line installation can be made easily. In addition, the management and the maintenance of the lines for monitoring can be done easily.

Therefore, according to the present invention, the lines for the connection between the semiconductor device fabrication facility and the central monitoring apparatus can be simplified, and the management and the maintenance of the lines can be easier so that the control of the monitoring system and the monitoring operation can be more efficient, and the expenses for the system maintenance and construction can be saved.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A monitoring system for semiconductor device fabrication facilities comprising:

a central monitoring apparatus outputting, via a selective signal line, a select signal having a specific frequency for selecting an object to be monitored, and receiving information transferred via an information transmission line from the object responsive to the select signal having the specific frequency; and a plurality of semiconductor device fabrication facility monitors, each having a corresponding predetermined frequency for response, and each of said monitors being connected in parallel to the selective signal line and the information transmission line, and outputting said information, received from a process of a corresponding device fabrication facility, via the information transmission line if and when said monitor is selected by the select signal transmitted via the selective signal line having the specific frequency matching the corresponding predetermined frequency.

2. The monitoring system for semiconductor device fabrication facilities of the claim 1, wherein the central monitoring apparatus comprises:

an output determining means for designating the specific frequency of the select signal;

a frequency generating means comprising a plurality of frequency generators each generating a unique frequency signal, said frequency generating means successively outputting each of said unique frequency signals as an output signal;

an outputting means for receiving the output signal from the frequency generating means and transmitting said signal as the select signal via the selective signal line;

an inputting means for receiving the information via the information transmission line; and a displaying means for displaying a response according to the information received from the inputting means.

3. The monitoring system for semiconductor device fabrication facilities of claim 2, wherein the output determining means comprises:

a first oscillating part for generating and outputting a first pulse signal;

a counter for performing a binary count of the first pulse signal and outputting a binary count signal; and an encoder for receiving the binary count signal and for providing a plurality of Enable signals for selecting, in a specific order according to the binary count signal, one of the plurality of frequency generators to selectively output the output signal.

4. The monitoring system for semiconductor device fabrication facilities of claim 2, wherein the outputting means comprises a plurality of first 3-state buffers each corresponding to one of the frequency generators, each of said first 3-state buffers having an Enable input connected with one of the plurality of Enable signals output from the output-determining means.

5. The monitoring system for semiconductor device fabrication facilities of the claim 2, wherein the inputting means comprises:

a plurality of second 3-state buffers each corresponding to one of the frequency generators, each of said second 3-state buffers having an input connected with the information transmission line, a corresponding Enable input connected with one of a plurality of Enable signals output from the output-determining means, and an output for outputting an output signal comprising the information signal when said corresponding Enable input is enabled by the output-determining means;

a second oscillating part which outputs a second pulse signal; and a latch which receives the output signals from said second 3-state buffers and outputs said output signals after a delay period corresponding to the second pulse signal.

6. The monitoring system for semiconductor device fabrication facilities of claim 5, wherein the displaying means comprises a plurality of lamps, each receiving one of the plurality of output signals from said latch corresponding to one of said plurality of second 3-state buffers, and wherein each lamp is turned on and off responsive to said output signal.

7. The monitoring system for semiconductor device fabrication facilities of claim 1, wherein the central monitoring apparatus is operated by outputting the select signal via the selective signal line, varying the specific frequency of the select signal, and selecting a semiconductor device facility corresponding to the select signal via the information transmission line.

8. The monitoring system for semiconductor device fabrication facilities of claim 7, wherein the central monitoring apparatus comprises:

an output determining means for randomly designating the frequency of the select signal;

a frequency generating means equipped with a plurality of frequency generators each generating a unique frequency signal, said frequency generating means randomly outputting each of said unique frequency signals as an output signal;

an outputting means for receiving the output signal from the frequency generating means and transmitting said signal as the select signal via the selective signal line;

an inputting means for receiving the information transmitted via the information transmission line; and a displaying means for displaying a response according to the information received from the inputting means.

9. The monitoring system for semiconductor device fabrication facilities of the claim 8, wherein the output-determining means comprises:

a designation signal input means for supplying an encoder select signal for randomly selecting one of the frequency generators; and an encoder for receiving the encoder select signal and for providing a plurality of Enable signals for selecting, according to the encoder select signal, one of the plurality of frequency generators to selectively output the output signal.

10. The monitoring system for semiconductor device fabrication facilities of the claim 9, wherein the designation signal input means comprises an input part for inputting a key signal.

11. The monitoring system for semiconductor device fabrication facilities of claim 9, wherein the designation signal input means comprises a host computer.

12. The monitoring system for semiconductor device fabrication facilities of claim 8, wherein the outputting means comprises a plurality of first 3-state buffers each corresponding to one of the frequency generators, each of said first 3-state buffers having an Enable input connected with one of the plurality of Enable signals output from the output-determining means.

13. The monitoring system for semiconductor device fabrication facilities of claim 8, wherein the inputting means comprises:

a plurality of second 3-state buffers each corresponding to one of the frequency generators, each of said second 3-state buffers having an input connected with the information transmission line, a corresponding Enable input connected with one of a plurality of Enable signals output from the output-determining means, and an output for outputting an output signal comprising the information signal when said corresponding Enable input is enabled by the output-determining means;

an oscillating part which outputs a pulse signal; and a latch which receives the output signals from said second 3-state buffers and outputs said output signals after a delay period corresponding to the second pulse signal.

14. The monitoring system for semiconductor device fabrication facilities of claim 8, wherein the displaying means comprises a plurality of lamps, each receiving one of the plurality of output signals from said latch corresponding to one of said plurality of second 3-state buffers, and wherein each lamp is turned on and off responsive to said output signal.

15. The monitoring system for semiconductor device fabrication facilities of the claim 1, wherein the semiconductor device fabrication facility monitor comprises:
    a switching means receiving a sensing signal from a sensor; and
    a filtering means for transferring the sensing signal from the switching means to the information transmission line when and if the specific frequency of the select signal applied from the central monitoring apparatus via the selective signal line is identical to the predetermined frequency.

16. The monitoring system for semiconductor device fabrication facilities of the claim 15, wherein the filtering means comprises:
    a frequency filter for determining if the specific frequency of the select signal is identical to the predetermined frequency and outputting a filter output signal in response thereto; and
    a switch for receiving the filter output signal and for selectively transferring the signal from the switching means to the information transmission line responsive to the filter output signal.

* * * * *